US009323395B2

(12) United States Patent
El Dokor (10) Patent No.: US 9,323,395 B2
(45) Date of Patent: *Apr. 26, 2016

(54) NEAR TOUCH INTERACTION WITH STRUCTURED LIGHT

(71) Applicant: Edge 3 Technologies, Inc., Phoenix, AZ (US)

(72) Inventor: Tarek El Dokor, Phoenix, AZ (US)

(73) Assignee: Edge 3 Technologies, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/600,032

(22) Filed: Jan. 20, 2015

(65) Prior Publication Data

US 2015/0130803 A1    May 14, 2015

Related U.S. Application Data

(63) Continuation of application No. 13/189,517, filed on Jul. 24, 2011, now Pat. No. 8,970,589.

(60) Provisional application No. 61/441,634, filed on Feb. 10, 2011.

(51) Int. Cl.
*G06F 3/042* (2006.01)
*G06T 7/00* (2006.01)

(52) U.S. Cl.
CPC ............ *G06F 3/0421* (2013.01); *G06T 7/0057* (2013.01); *G06F 2203/04104* (2013.01); *G06F 2203/04108* (2013.01); *G06T 2200/04* (2013.01); *G06T 2207/10021* (2013.01)

(58) Field of Classification Search
CPC ............... G06F 3/0421; G06F 2203/04104; G06F 2203/04108; G06T 2200/04; G06T 2207/10021
USPC ................. 345/423, 426, 642, 157–158, 173; 382/106–107, 282
See application file for complete search history.

(56) References Cited

U.S. PATENT DOCUMENTS

| 5,454,043 A | 9/1995 | Freeman |
| 5,544,050 A | 8/1996 | Abe et al. |

(Continued)

FOREIGN PATENT DOCUMENTS

WO    WO 2007011207 A1 * 1/2007 ........... G08B 13/196

OTHER PUBLICATIONS

Freeman, W. T. et al., "The Design and Use of Steerable Filters", *IEEE Transactions of Pattern Analysis and Machine Intelligence* V. 13, (Sep. 1991),891-906.

(Continued)

*Primary Examiner* — Ke Xiao
*Assistant Examiner* — Jed-Justin Imperial
(74) *Attorney, Agent, or Firm* — Gordon Kessler (57) ABSTRACT

A near-touch interface is provided that utilizes stereo cameras and a series of targeted structured light tessellations, emanating from the screen as a light source and incident on objects in the field-of-view. After radial distortion from a series of wide-angle lenses is mitigated, a surface-based spatio-temporal stereo algorithm is utilized to estimate initial depth values. Once these values are calculated, a subsequent refinement step may be applied in which light source tessellations are used to flash a structure onto targeted components of the scene, where initial near-interaction disparity values have been calculated. The combination of a spherical stereo algorithm, and smoothing with structured light source tessellations, provides for a very reliable and fast near-field depth engine, and resolves issues that are associated with depth estimates for embedded solutions of this approach.

25 Claims, 3 Drawing Sheets

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,699,441 A | 12/1997 | Sagawa et al. |
| 5,767,842 A | 6/1998 | Korth |
| 5,887,069 A | 3/1999 | Sakou et al. |
| 5,990,865 A | 11/1999 | Gard |
| 6,002,808 A | 12/1999 | Freeman |
| 6,072,494 A | 6/2000 | Nguyen |
| 6,075,895 A | 6/2000 | Qiao et al. |
| 6,115,482 A | 9/2000 | Sears et al. |
| 6,128,003 A | 10/2000 | Smith et al. |
| 6,141,434 A | 10/2000 | Christian et al. |
| 6,147,678 A | 11/2000 | Kumar et al. |
| 6,181,343 B1 | 1/2001 | Lyons |
| 6,195,104 B1 | 2/2001 | Lyons |
| 6,204,852 B1 | 3/2001 | Kumar et al. |
| 6,215,890 B1 | 4/2001 | Matsuo et al. |
| 6,222,465 B1 | 4/2001 | Kumar et al. |
| 6,240,197 B1 | 5/2001 | Christian et al. |
| 6,240,198 B1 | 5/2001 | Rehg et al. |
| 6,252,598 B1 | 6/2001 | Segen |
| 6,256,033 B1 | 7/2001 | Nguyen |
| 6,256,400 B1 | 7/2001 | Takata et al. |
| 6,269,172 B1 | 7/2001 | Rehg et al. |
| 6,323,942 B1 | 11/2001 | Bamji |
| 6,324,453 B1 | 11/2001 | Breed et al. |
| 6,360,003 B1 | 3/2002 | Doi et al. |
| 6,363,160 B1 | 3/2002 | Bradski et al. |
| 6,377,238 B1 | 4/2002 | McPheters |
| 6,389,182 B1 | 5/2002 | Ihara et al. |
| 6,394,557 B2 | 5/2002 | Bradski |
| 6,400,830 B1 | 6/2002 | Christian et al. |
| 6,434,255 B1 | 8/2002 | Harakawa |
| 6,442,465 B2 | 8/2002 | Breed et al. |
| 6,456,728 B1 | 9/2002 | Doi et al. |
| 6,478,432 B1 | 11/2002 | Dyner |
| 6,509,707 B2 | 1/2003 | Yamashita et al. |
| 6,512,838 B1 | 1/2003 | Rafii et al. |
| 6,526,156 B1 | 2/2003 | Black et al. |
| 6,553,296 B2 | 4/2003 | Breed et al. |
| 6,556,708 B1 | 4/2003 | Christian et al. |
| 6,571,193 B1 | 5/2003 | Unuma et al. |
| 6,590,605 B1 | 7/2003 | Eichenlaub |
| 6,600,475 B2 | 7/2003 | Gutta et al. |
| 6,608,910 B1 | 8/2003 | Srinivasa et al. |
| 6,614,422 B1 | 9/2003 | Rafii et al. |
| 6,624,833 B1 | 9/2003 | Kumar et al. |
| 6,674,877 B1 | 1/2004 | Jojic et al. |
| 6,674,895 B2 | 1/2004 | Rafii et al. |
| 6,678,425 B1 | 1/2004 | Flores et al. |
| 6,681,031 B2 | 1/2004 | Cohen et al. |
| 6,683,968 B1 | 1/2004 | Pavlovic et al. |
| 6,704,447 B2 * | 3/2004 | Sukthankar et al. .......... 382/170 |
| 6,757,571 B1 | 6/2004 | Toyama |
| 6,766,036 B1 | 7/2004 | Pryor |
| 6,768,486 B1 | 7/2004 | Szabo et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,829,730 B2 | 12/2004 | Nadeau-Dostie et al. |
| 6,857,746 B2 | 2/2005 | Dyner |
| 6,901,561 B1 | 5/2005 | Kirkpatrick et al. |
| 6,937,742 B2 | 8/2005 | Roberts et al. |
| 6,940,646 B2 | 9/2005 | Taniguchi et al. |
| 6,944,315 B1 | 9/2005 | Zipperer et al. |
| 6,950,534 B2 | 9/2005 | Cohen et al. |
| 6,993,462 B1 | 1/2006 | Pavlovic et al. |
| 7,039,676 B1 | 5/2006 | Day et al. |
| 7,046,232 B2 | 5/2006 | Inagaki et al. |
| 7,050,606 B2 | 5/2006 | Paul et al. |
| 7,050,624 B2 | 5/2006 | Dialameh et al. |
| 7,058,204 B2 | 6/2006 | Hildreth et al. |
| 7,065,230 B2 | 6/2006 | Yuasa et al. |
| 7,068,842 B2 | 6/2006 | Liang et al. |
| 7,095,401 B2 | 8/2006 | Liu et al. |
| 7,102,615 B2 | 9/2006 | Marks |
| 7,129,927 B2 | 10/2006 | Mattsson |
| 7,170,492 B2 | 1/2007 | Bell |
| 7,190,811 B2 | 3/2007 | Ivanov |
| 7,203,340 B2 | 4/2007 | Gorodnichy |
| 7,212,663 B2 | 5/2007 | Tomasi |
| 7,221,779 B2 | 5/2007 | Kawakami et al. |
| 7,224,830 B2 | 5/2007 | Nefian et al. |
| 7,224,851 B2 | 5/2007 | Kinjo |
| 7,233,320 B1 | 6/2007 | Lapstun et al. |
| 7,236,611 B2 | 6/2007 | Roberts et al. |
| 7,239,718 B2 | 7/2007 | Park et al. |
| 7,257,237 B1 | 8/2007 | Luck et al. |
| 7,274,800 B2 | 9/2007 | Nefian et al. |
| 7,274,803 B1 | 9/2007 | Sharma et al. |
| 7,289,645 B2 | 10/2007 | Yamamoto et al. |
| 7,295,709 B2 | 11/2007 | Cootes et al. |
| 7,296,007 B1 | 11/2007 | Funge et al. |
| 7,308,112 B2 | 12/2007 | Fujimura et al. |
| 7,340,077 B2 | 3/2008 | Gokturk et al. |
| 7,340,078 B2 | 3/2008 | Shikano et al. |
| 7,342,485 B2 | 3/2008 | Joehl et al. |
| 7,346,192 B2 | 3/2008 | Yuasa et al. |
| 7,348,963 B2 | 3/2008 | Bell |
| 7,359,529 B2 | 4/2008 | Lee |
| 7,372,977 B2 | 5/2008 | Fujimura et al. |
| 7,379,563 B2 | 5/2008 | Shamaie |
| 7,391,409 B2 | 6/2008 | Zalewski et al. |
| 7,394,346 B2 | 7/2008 | Bodin |
| 7,412,077 B2 | 8/2008 | Li et al. |
| 7,415,126 B2 | 8/2008 | Breed et al. |
| 7,415,212 B2 | 8/2008 | Matsushita et al. |
| 7,421,093 B2 | 9/2008 | Hildreth et al. |
| 7,423,540 B2 | 9/2008 | Kisacanin |
| 7,444,001 B2 | 10/2008 | Roberts et al. |
| 7,450,736 B2 | 11/2008 | Yang et al. |
| 7,460,690 B2 | 12/2008 | Cohen et al. |
| 7,477,758 B2 | 1/2009 | Piirainen et al. |
| 7,489,308 B2 | 2/2009 | Blake et al. |
| 7,489,806 B2 | 2/2009 | Mohri et al. |
| 7,499,569 B2 | 3/2009 | Sato et al. |
| 7,512,262 B2 | 3/2009 | Criminisi et al. |
| 7,519,223 B2 | 4/2009 | Dehlin et al. |
| 7,519,537 B2 | 4/2009 | Rosenberg |
| 7,574,020 B2 | 8/2009 | Shamaie |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,547 B2 | 10/2009 | Sun et al. |
| 7,606,411 B2 | 10/2009 | Venetsky et al. |
| 7,614,019 B2 | 11/2009 | Rimas Ribikauskas et al. |
| 7,620,316 B2 | 11/2009 | Boillot |
| 7,646,372 B2 | 1/2010 | Marks et al. |
| 7,660,437 B2 | 2/2010 | Breed |
| 7,665,041 B2 | 2/2010 | Wilson et al. |
| 7,676,062 B2 | 3/2010 | Breed et al. |
| 7,720,282 B2 | 5/2010 | Blake et al. |
| 7,721,207 B2 | 5/2010 | Nilsson |
| 7,804,998 B2 | 9/2010 | Mundermann et al. |
| 2001/0030642 A1 | 10/2001 | Sullivan et al. |
| 2002/0041327 A1 | 4/2002 | Hildreth et al. |
| 2002/0064382 A1 | 5/2002 | Hildreth et al. |
| 2002/0090133 A1 | 7/2002 | Kim et al. |
| 2002/0140633 A1 | 10/2002 | Rafii et al. |
| 2004/0001182 A1 | 1/2004 | Dyner |
| 2004/0183775 A1 | 9/2004 | Bell |
| 2005/0002074 A1 | 1/2005 | McPheters et al. |
| 2005/0052755 A1 * | 3/2005 | Lawson et al. ................ 359/722 |
| 2005/0083314 A1 | 4/2005 | Shalit et al. |
| 2005/0105775 A1 | 5/2005 | Luo et al. |
| 2005/0190443 A1 | 9/2005 | Nam et al. |
| 2005/0286756 A1 | 12/2005 | Hong et al. |
| 2006/0093186 A1 | 5/2006 | Ivanov |
| 2006/0101354 A1 | 5/2006 | Hashimoto et al. |
| 2006/0136846 A1 | 6/2006 | Im et al. |
| 2006/0139314 A1 | 6/2006 | Bell |
| 2006/0221072 A1 | 10/2006 | Se et al. |
| 2007/0055427 A1 | 3/2007 | Sun et al. |

(56) References Cited

U.S. PATENT DOCUMENTS

| | | | |
|---|---|---|---|
| 2007/0113207 A1 | 5/2007 | Gritton | |
| 2007/0132721 A1 | 6/2007 | Glomski et al. | |
| 2007/0195997 A1 | 8/2007 | Paul et al. | |
| 2007/0217776 A1* | 9/2007 | Torvinen | 396/89 |
| 2007/0263932 A1 | 11/2007 | Bernardin et al. | |
| 2007/0280505 A1 | 12/2007 | Breed | |
| 2008/0002878 A1 | 1/2008 | Meiyappan | |
| 2008/0005703 A1 | 1/2008 | Radivojevic et al. | |
| 2008/0013793 A1 | 1/2008 | Hillis et al. | |
| 2008/0037875 A1 | 2/2008 | Kim et al. | |
| 2008/0052643 A1 | 2/2008 | Ike et al. | |
| 2008/0059578 A1 | 3/2008 | Albertson et al. | |
| 2008/0065291 A1 | 3/2008 | Breed | |
| 2008/0069415 A1 | 3/2008 | Schildkraut et al. | |
| 2008/0069437 A1 | 3/2008 | Baker | |
| 2008/0104547 A1 | 5/2008 | Morita et al. | |
| 2008/0107303 A1 | 5/2008 | Kim et al. | |
| 2008/0120577 A1 | 5/2008 | Ma et al. | |
| 2008/0178126 A1 | 7/2008 | Beeck et al. | |
| 2008/0181459 A1 | 7/2008 | Martin et al. | |
| 2008/0219501 A1 | 9/2008 | Matsumoto | |
| 2008/0219502 A1 | 9/2008 | Shamaie | |
| 2008/0225041 A1 | 9/2008 | El Dokor et al. | |
| 2008/0229255 A1 | 9/2008 | Linjama et al. | |
| 2008/0240502 A1 | 10/2008 | Freedman et al. | |
| 2008/0244465 A1 | 10/2008 | Kongqiao et al. | |
| 2008/0244468 A1 | 10/2008 | Nishihara et al. | |
| 2008/0267449 A1 | 10/2008 | Dumas et al. | |
| 2008/0282202 A1 | 11/2008 | Sunday | |
| 2009/0003661 A1* | 1/2009 | Ionita et al. | 382/118 |
| 2009/0006292 A1 | 1/2009 | Block | |
| 2009/0027337 A1 | 1/2009 | Hildreth | |
| 2009/0037849 A1 | 2/2009 | Immonen et al. | |
| 2009/0040215 A1 | 2/2009 | Afzulpurkar et al. | |
| 2009/0060268 A1 | 3/2009 | Roberts et al. | |
| 2009/0074248 A1 | 3/2009 | Cohen et al. | |
| 2009/0077504 A1 | 3/2009 | Bell et al. | |
| 2009/0079813 A1 | 3/2009 | Hildreth | |
| 2009/0080526 A1 | 3/2009 | Vasireddy et al. | |
| 2009/0085864 A1 | 4/2009 | Kutliroff et al. | |
| 2009/0102788 A1 | 4/2009 | Nishida et al. | |
| 2009/0102800 A1 | 4/2009 | Keenan | |
| 2009/0103780 A1 | 4/2009 | Nishihara et al. | |
| 2009/0108649 A1 | 4/2009 | Kneller et al. | |
| 2009/0109036 A1 | 4/2009 | Schalla et al. | |
| 2009/0110292 A1 | 4/2009 | Fujimura et al. | |
| 2009/0115721 A1 | 5/2009 | Aull et al. | |
| 2009/0116742 A1 | 5/2009 | Nishihara | |
| 2009/0116749 A1 | 5/2009 | Cristinacce et al. | |
| 2009/0150160 A1 | 6/2009 | Mozer | |
| 2009/0153366 A1 | 6/2009 | Im et al. | |
| 2009/0153655 A1 | 6/2009 | Ike et al. | |
| 2009/0180668 A1 | 7/2009 | Jones et al. | |
| 2009/0183125 A1 | 7/2009 | Magal et al. | |
| 2009/0183193 A1 | 7/2009 | Miller, Iv | |
| 2009/0189858 A1 | 7/2009 | Lev et al. | |
| 2009/0208057 A1 | 8/2009 | Wilson et al. | |
| 2009/0222149 A1 | 9/2009 | Murray et al. | |
| 2009/0228841 A1 | 9/2009 | Hildreth | |
| 2009/0231278 A1 | 9/2009 | St. Hilaire et al. | |
| 2009/0244309 A1 | 10/2009 | Maison et al. | |
| 2009/0249258 A1 | 10/2009 | Tang | |
| 2009/0262986 A1 | 10/2009 | Cartey et al. | |
| 2009/0268945 A1 | 10/2009 | Wilson et al. | |
| 2009/0273563 A1 | 11/2009 | Pryor | |
| 2009/0273574 A1 | 11/2009 | Pryor | |
| 2009/0273575 A1 | 11/2009 | Pryor | |
| 2009/0278915 A1 | 11/2009 | Kramer et al. | |
| 2009/0295738 A1 | 12/2009 | Chiang | |
| 2009/0296991 A1 | 12/2009 | Anzola | |
| 2009/0315740 A1 | 12/2009 | Hildreth et al. | |
| 2009/0316952 A1 | 12/2009 | Ferren et al. | |
| 2010/0014770 A1* | 1/2010 | Huggett et al. | 382/260 |
| 2010/0048242 A1* | 2/2010 | Rhoads et al. | 455/556.1 |
| 2011/0102553 A1* | 5/2011 | Corcoran et al. | 348/50 |
| 2013/0088462 A1* | 4/2013 | So et al. | 345/175 |

OTHER PUBLICATIONS

Simoncelli, E.P. et al., "Shiftable Multi-scale Transforms", *IEEE Transactions on Information Theory* V. 38, (Mar. 1992),587-607.

Simoncelli, E.P. et al., "The Steerable Pyramid: A Flexible Architecture for Multi-Scale Derivative Computation", *Proceedings of ICIP-95* V. 3, (Oct. 1995),444-447.

Chen, J et al., "Adaptive Perceptual Color-Texture Image Segmentation", *IEEE Transactions on Image Processing*, v. 14, No. 10, (Oct. 2005),1524-1536 (2004 revised draft).

Halfhill, Tom R., "Parallel Processing with CUDA", *Microprocessor Report*, Available at http://www.nvidia.com/docs/IO/55972/220401_Reprint.pdf,(Jan. 28, 2008).

Farber, Rob "CUDA, Supercomputing for the Masses: Part 4, The CUDA Memory Model", Under the High Performance Computing section of the Dr. Dobbs website, page 3 available at http://www.ddj.com/hpc-high-performance-computing/208401741, 3.

Rajko, S et al., "HMM Parameter Reduction for Practice Gesture Recognition", *Proceedings of the International Conference on Automatic Gesture Recognition*, (Sep. 2008).

Hinton, Geoffrey et al., "A Fast Learning Algorithm for Deep Belief Nets", *Neural Computation*, V. 18, 1527-1554.

Susskind, Joshua M., et al., "Generating Facial Expressions with Deep Belief Nets", *Department of Psychology, Univ. of Toronto I-Tech Education and Publishing*, (2008),421-440.

Bleyer, Michael et al., "Surface Stereo with Soft Segmentation.", *Computer Vision and Pattern Recognition*. IEEE, 2010, (2010).

Chen, Junqing et al., "Adaptive perceptual color-texture image segmentation.",*The International Society for Optical Engineering*, SPIE Newsroom, (2006),1-2.

Forsyth, David A., et al., "Stereopsis", *In Computer Vision a Modern Approach Prentice Hall*, 2003, (2003).

Harris, Mark et al., "Parallel Prefix Sum (Scan) with CUDA", vol. 39 in *GPU Gems 3*, edited by Hubert Nguyen, (2007).

Hirschmuller, Heiko "Stereo Vision in Structured Environments by Consistent Semi-Global Matching", *Computer Vision and Pattern Recognition*, CVPR 06 (2006),2386-2393.

Ivekovic, Spela et al., "Dense Wide-baseline Disparities from Conventional Stereo for Immersive Videoconferencing", *ICPR*. 2004, (2004),921-924.

Kaldewey, Tim et al., "Parallel Search on Video Cards.", *First USENIX Workshop on Hot Topics in Parallelism* (HotPar '09), (2009).

Kirk, David et al., "Programming Massively Parallel Processors a Hands-on Approach", *Elsevier*, 2010, (2010).

Klaus, Andreas et al., "Segment-Based Stereo Matching Using Belief Propagation and a Self-Adapting Dissimilarity Measure", *Proceedings of ICPR 2006. IEEE, 2006*, (2006),15-18.

Kolmogorov, Vladimir et al., "Computing Visual Correspondence with Occlusions via Graph Cuts", *International Conference on Computer Vision*. 2001., (2001).

Kolmogorov, Vladimir et al., "Generalized Multi-camera Scene Reconstruction Using Graph Cuts.", *Proceedings for the International Workshop on Energy Minimization Methods in Computer Vision and Pattern Recognition*. 2003. (2003).

Kuhn, Michael et al., "Efficient ASIC Implementation of a Real-Time Depth Mapping Stereo Vision System", Proceedings of 2009 *IEEE International Conference on Acoustics, Speech and Signal Processing*. Taipei, Taiwan: IEEE, 2009. (2009).

Li, Shigang "Binocular Spherical Stereo", *IEEE Transactions on Intelligent Transportation Systems* (IEEE) 9, No. 4 (Dec. 2008), 589-600.

Marsalek, M et al., "Semantic hierarchies for visual object recognition", *Proceedings of IEEE Conference on Computer Vision and Pattern Recognition*, 2007. CVPR '07. MN: IEEE, 2007, (2007),1-7.

Metzger, Wolfgang "Laws of Seeing", *MIT Press*, 2006, (2006).

Min, Dongbo et al., "Cost Aggregation and Occlusion Handling With WLS in Stereo Matching", *Edited by IEEE. EEE Transactions on Image Processing* 17 (2008), (2008),1431-1442.

(56) References Cited

OTHER PUBLICATIONS

"NVIDIA: CUDA compute unified device architecture, prog. guide, version 1.1", *NVIDIA*, (2007).
Remondino, Fabio et al., "Turning Images into 3-D Models", *IEEE Signal Processing Magazine*, (2008).
Richardson, Ian E., "H.264/MPEG-4 Part 10 White Paper", White Paper/www.vcodex.com, (2003).
Sengupta, Shubhabrata "Scan Primitives for GPU Computing", *Proceedings of the 2007 Graphics Hardware Conference*. San Diego, CA, 2007, (2007),97-106.
Sintron, Eric et al., "Fast Parallel GPU-Sorting Using a Hybrid Algorithm", *Journal of Parallel and Distributed Computing* (Elsevier) 68, No. 10, (Oct. 2008),1381-1388.
Wang, Zeng-Fu et al., "A Region Based Stereo Matching Algorithm Using Cooperative Optimization", *CVPR* (2008).
Wei, Zheng et al., "Optimization of Linked List Prefix Computations on Multithreaded GPUs Using CUDA", 2010 *IEEE International Symposium on Parallel & Distributed Processing (IPDPS)*. Atlanta, (2010).
Wiegand, Thomas et al., "Overview of the H.264/AVC Video Coding Standard", *IEEE Transactions on Circuits and Systems for Video Technology* 13, No. 7, (Jul. 2003),560-576.
Woodford, O.J. et al., "Global Stereo Reconstruction under Second Order Smoothness Priors", *IEEE Transactions on Pattern Analysis and Machine Intelligence* (IEEE) 31, No. 12, (2009),2115-2128.
Yang, Qingxiong et al., "Stereo Matching with Color-Weighted Correlation, Hierarchical Belief Propagation, and Occlusion Handling", *IEEE Transactions on Pattern Analysis and Machine Intelligence (IEEE)* 31, No. 3, (Mar. 2009),492-504.
Zinner, Christian et al., "An Optimized Software-Based Implementation of a Census-Based Stereo Matching Algorithm", *Lecture Notes in Computer Science* (SpringerLink) 5358, (2008),216-227.
"PCT Search report", PCT/US2010/035717, (Sep. 1, 2010),1-29.
"PCT Written opinion", PCT/US2010/035717, (Dec. 1, 2011),1-9.
"PCT Search report", PCT/US2011/49043, (Mar. 21, 2012), 1-4.
"PCT Written opinion", PCT/US2011/49043, (Mar. 21, 2012), 1-4.
"PCT Search report", PCT/US2011/049808, (Jan. 12, 2012), 1-2.
"PCT Written opinion", PCT/US2011/049808, (Jan. 12, 2012), 1-5.
"Non-Final Office Action", U.S. Appl. No. 12/784,123, (Oct. 2, 2012), 1-20.
"Non-Final Office Action", U.S. Appl. No. 12/784,022, (Jul. 16, 2012), 1-14.
Tieleman, T et al., "Using Fast weights to improve persistent contrastive divergence", 26th *International Conference on Machine Learning* New York, NY ACM, (2009),1033-1040.
Sutskever, I et al., "The recurrent temporal restricted boltzmann machine", *NIPS*, MIT Press, (2008),1601-1608.
Parzen, E "On the estimation of a probability density function and the mode", *Annals of Math. Stats.*, 33, (1962),1065-1076.
Hopfield, J.J. "Neural networks and physical systems with emergent collective computational abilities", *National Academy of Sciences*, 79, (1982),2554-2558.
Culibrk, D et al., "Neural network approach to background modeling for video object segmentation", *IEEE Transactions on Neural Networks*, 18, (2007),1614-1627.
Benggio, Y et al., "Curriculum learning", ICML 09 Proceedings of the 26th Annual International Conference on Machine Learning, New York, NY: ACM, (2009).
Benggio, Y et al., "Scaling learning algorithms towards AI. In L. a Bottou", *Large Scale Kernel Machines*, MIT Press,(2007).
Battiato, S et al., "Exposure correction for imaging devices: An overview", In R. Lukac (Ed.), *Single Sensor Imaging Methods and Applications for Digital Cameras*, CRC Press,(2009),323-350.
El Dokor, T., "Sources and Shading" lecture notes, Jun. 9, 2004.

* cited by examiner

NEAR TOUCH INTERACTION WITH STRUCTURED LIGHT

CROSS REFERENCE TO RELATED APPLICATIONS

This application is a continuation of U.S. patent application Ser. No. 13/189,517 filed Jul. 24, 2011, titled "Near-Touch Interaction with a Stereo Camera Grid and Structured Tesellations" to El Dokor, which in turn claims the benefit of U.S. Provisional Patent Application Ser. No. 61/441,630 filed Feb. 10, 2011, titled "Near-Touch Interaction with a Stereo Camera Grid and Structured Tessellations" to El Dokor, the contents of each of these applications being incorporated herein by reference.

BACKGROUND OF THE INVENTION

Multi-touch technology has become a standard modus of interaction with new touch screens. Such screens are becoming more pervasive, making their way into mobile technology and allowing for evolving forms of interaction. Such touch screen technology has enabled a shift in computing into a new brand of devices, including tablet computers, mobile devices and other touch screen supported systems. The problems with various single and multi-touch systems are many. Smudging is the most obvious one, in which the screen becomes unclear from regular usage. Hygiene is another issue in which the screen, especially if used by more than one person, may become unhygienic. Reliability and dependability of the screen are other considerations, along with the price associated with integrating a touch screen into a tablet device. Responsiveness that is associated with multi-touch gestures is another issue, since there exists a significant lag in the operation of the system itself.

A cheaper and more effective solution is to utilize optical sensors embedded in the bezel of the screen at various locations. Systems with sensors arrangements in the bezel are already available on tablets and other systems, and some are being made available in the near future. Optical-based interaction, if successful, is cheaper to install than a touch screen, and provides for a better and more reliable viewing quality. To enable such an optical based interface, depth has to be constructed in an area close to the screen's surface, i.e. a three dimensional representation of any objects positioned close to the screen's surface must be constructed so that movement relative to the screen may be determined. Once depth is calculated, replacing multi-touch gestural events with near-touch events that are emulating the same behavior becomes trivial.

There are no methods available today to reconstruct depth at such a close distance for real-time applications. Some work exists in the literature on spherical stereo, such as that presented in Li, Shigang. "Binocular Spherical Stereo" IEEE Transactions on Intelligent Transportation Systems (IEEE) 9, no. 4 (December 2008): 589-600. however such methods are computationally expensive and lack robustness for them to be applicable to a tablet computer. In accordance with embodiments of the present invention, a different stereo approach, presented in U.S. patent application Ser. No. 13/025,038, filed Feb. 10, 2011 by El Dokor et al., titled "Method and Apparatus for Segmentation of an Image", the contents thereof being incorporated herein by reference, may be employed. A similar dewarping algorithm to that used by Li (noted above) may also be employed as a preprocessing step to the algorithm. A detailed description of this stereo algorithm has been presented in, for example, the above referenced '038 patent application. Building on the similar concepts of disparity computation with stereo, in accordance with the present invention, a novel approach is utilized for the implementation of near-touch systems.

There are other methods that are known to one of ordinary skill in the art for performing depth computation other than computational stereo. One such method utilizes an active light source with a structured pattern (these methods are sometimes referred to as active stereo). A pattern may be projected onto the field-of-view (FOV) from a light source close to the imager, and then the distance between the individual patterns is calculated. Some examples of this approach include Microsoft's Kinect™ Xbox™ peripheral, and PrimeSense's ASIC+Prime Sensor, as described in Meir Machline, Yoel Arieli Alexander Shpunt and Barak Freedman, "Depth Mapping Using Projected Patterns", May 12, 2010, where various spots of light are utilized for the calculation of a depth map. In addition to the fact that the light source is usually in the infrared range, and requires a significant amount of energy, active stereo suffers from a number of practical and computational drawbacks. For instance, such methods are usually utilized to address depth computation at extremely large distances (relative to the screen, in the context of a few inches), forcing the light source to be very power-consuming and bulky. The data from the depth images have to be evaluated over a number of frames, making the data sluggish and introducing a significant amount of motion blur and computational artifacts that become apparent in performance. Such methods are inappropriate for near-touch interaction.

Therefore, it would be desirable to present a near touch system that overcomes the drawbacks of the prior art.

SUMMARY OF THE INVENTION

In accordance with various embodiments of the present invention, a method for determining near touch interaction that is significantly more reliable and easy to embed than presently available methods, utilizing depth compute algorithms, is presented. Additionally, the introduction of a light source to smooth disparity computations and the overall generated depth map in targeted regions for further refinement is also presented in accordance with various embodiments of the present invention, and helps to improve the quality and consistency of the depth map.

Near Touch System

In accordance with embodiments of the present invention a medium of interaction that is to be enabled must first be defined. A near-touch interface may be used to define any interface that can be operated at a distance of roughly 4-14 inches away from a screen. As noted above, there are many technologies that are available today to enable a near-touch system commercially. Some may utilize infrared sensors; others may utilize ultrasound ones. A third category may utilize time-of-flight cameras.

The inventive approach utilizes depth computation, referred to in the above referenced '038 patent application, to produce a depth map. Cameras are preferably utilized with wide-angle lenses, and a dewarping step may be used on the images to remove various warping artifacts and effects that are associated with a wide-angle lens. Dewarping on the data may first be attempted such that two images are input to the system that are mostly free of any lens distortions.

The inventive approach presented in accordance with various embodiments of the present invention may also utilize the screen as a light source, to also minimize the entropy that is associated with a depth estimate, removing the need for further iterating and segmenting larger regions and reducing computational complexity, as described in the above referenced patent application. Additionally, for high-speed LED screens, patterns can be flashed onto the user's hand (or other object being used for near touch) to help improve depth calculations. This is similar to what has been suggested in active stereo methods, where an external IR light source is utilized. Instead, in accordance with the present invention, the screen itself may be utilized as a directed light source, and only targeting specific regions that may require additional information and help in forming an accurate depth map.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

One or more embodiments of the invention will now be described, making reference to the following drawings in which like reference numbers indicate like structure between the drawings.

Figure 1:
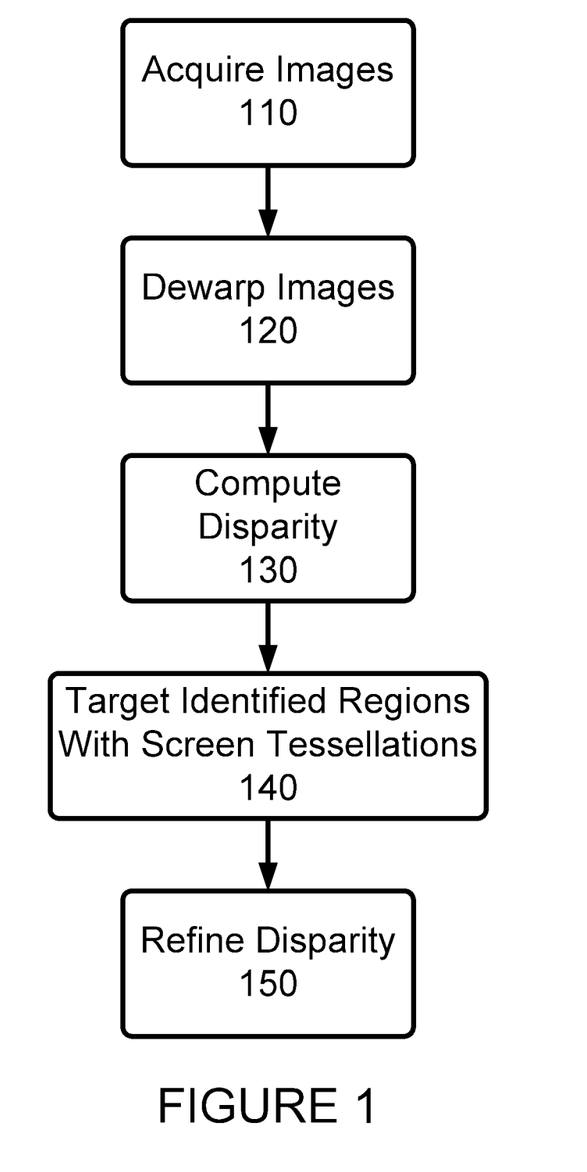
FIG. 1 is a flowchart diagram depicting an overall process flow in accordance with a preferred embodiment of the present invention.

An overview of a preferred approach in accordance with an embodiment of the present invention is shown in FIG. 1. As is shown in FIG. 1, at step 110 one or more images are acquired, and then at step 120, these images may be dewarped if desired or determined necessary or advantageous. A disparity is computed at step 130, and at step 140 target regions may be identified and illuminated with screen tessellations. Finally, at step 150, disparity is refined.

In accordance with one or more embodiments of the present invention, wide angle lenses are preferably utilized. Such wide angle lenses allow for a wide field of view to be acquired, allow for the viewing of objects close to the cameras, and thus the display, and also produce a shallow depth of field, thus blurring a background or other objects potentially in the field of view other than the object to be tracked. One or more lenses on the cameras may further be provided to play a role of one or more multiple bandpass filters to allow and block passage of different frequencies of the light spectrum, as may be determined to be desirable.

The inventive approach allows for a computationally less expensive algorithm and enables a fast iteration with which the initial depth estimate may be further smoothed. In accordance with the invention, an ideal segment, s, exists in three-dimensional space. The estimated segment, $\tilde{s}$ (x, y, $\tilde{d}$), of the ideal segment exists only in one disparity value. Hence, the initial computed disparity represents the orthogonal projection of the segment, s, onto disparity plane, $\tilde{d}$. This is a many-to-one mapping. So, one can define the relationship as:

$$s(x,y,d) = \tilde{s}(x,y,\tilde{d}) + \Psi(x,y) \quad \text{Equation 1}$$

where $\Psi$ represents the difference, in disparity between the original segment and its orthogonal projection. Thus, $\Psi$ is an ordered sequence that has the same dimensions as the given segment, and can be approximated by a mixture of Gaussians. Approximating $\Psi$ then becomes the real challenge solved in accordance with embodiments of the present invention, to save computation and prevent the need for a further iterative step in the process of formation of the depth map.

Estimating the Disparity Difference $\Psi$

An efficient means for estimating $\Psi$ is to compute the disparity associated with an active pattern that is produced from the screen or monitor. That pattern is used to produce a coarse grid of depth values. Some points on this grid do coincide with the overall depth estimate, and some don't.

Define the actual set of all disparities that are associated with a given ideal segment, s, as:

$D = \{D_1, \ldots, D_n\}$, such that the estimated disparity, $\tilde{d}$, is assigned only one value from the set, meaning $$\tilde{d} \in \{D_1, \ldots, D_n\} \quad \text{Equation 2}$$

Estimating $\Psi(x,y)$ for the individual pixels, $$\Psi(x,y) \approx GMM(S_1, S_2, S_3) + \alpha \quad \text{Equation 3}$$

where $S_1$, $S_2$, and $S_3$ are the three nearest values from the structured light respectively and $\alpha$ is the associated smoothing factor (as described in Meir Machline, Yoel Arieli Alexander Shpunt and Barak Freedman, "Depth Mapping Using Projected Patterns", May 12, 2010, and GMM represents a mixture of Gaussians. More neighboring values can be included in the estimation. The total number of Gaussian mixtures doesn't necessarily have to be limited to three.

An object that has been estimated at a given disparity is preferably further refined with a coarse disparity estimate within the vicinity of the estimated disparity value, based on the approximation of $\Psi(x,y)$ that can be obtained from utilizing a structured light source. In a preferred embodiment of the present invention, this structured light source is preferably utilized over only a portion of the object, and in particular, used to aid in refining the depth map for a portion of the object in which such a depth map is difficult to determine, or otherwise is indicative of benefiting from such additional refinement. The light source may further be employed in one or more frames, these frames not necessarily being consecutive. The projections may further be selected in a manner to be shielded from the field of view of a user, or otherwise blocked from view. Such structured light may be further provided as patterns changed at very high speeds, and targeting only portions of the field of view where it is determined such structured light may be helpful in further refining depth estimations. Further, the structured light is preferably adaptive to various environmental conditions, thus becoming brighter when, for example, ambient light is brighter, and becoming less bright when ambient light is less bright. Such patterns may vary in one or more of size, location, orientation or frequency depending on size and depth of the targeted region. These structured light patterns may be further interleaved with actual displayed data so that the structured light may be displayed without being perceived by the user.

The resulting modified segment s'(x,y,d') represents a smoothed version of the original computed estimate, $\tilde{s}$. This smoothed version allows for access to a detailed depth map represented in the data, smoothed over a range of disparities. If a segment is completely parallel to the field-of-view, s and s̃ are nearly identical. If the segment is slanted, away or towards the cameras in the field-of-view, s and 3' begin to differ quite significantly. The implications and consequences of this idea will be further considered below.

An easy way to visualize this approach, and to justify the utilization of a lower-resolution coarse depth estimate, to help smooth and improve upon the depth estimate, is to view the projection of each of the two cases (slanted towards and away from the screen) onto the scene, and to evaluate the entropy that is associated with such cases.

Figure 2:
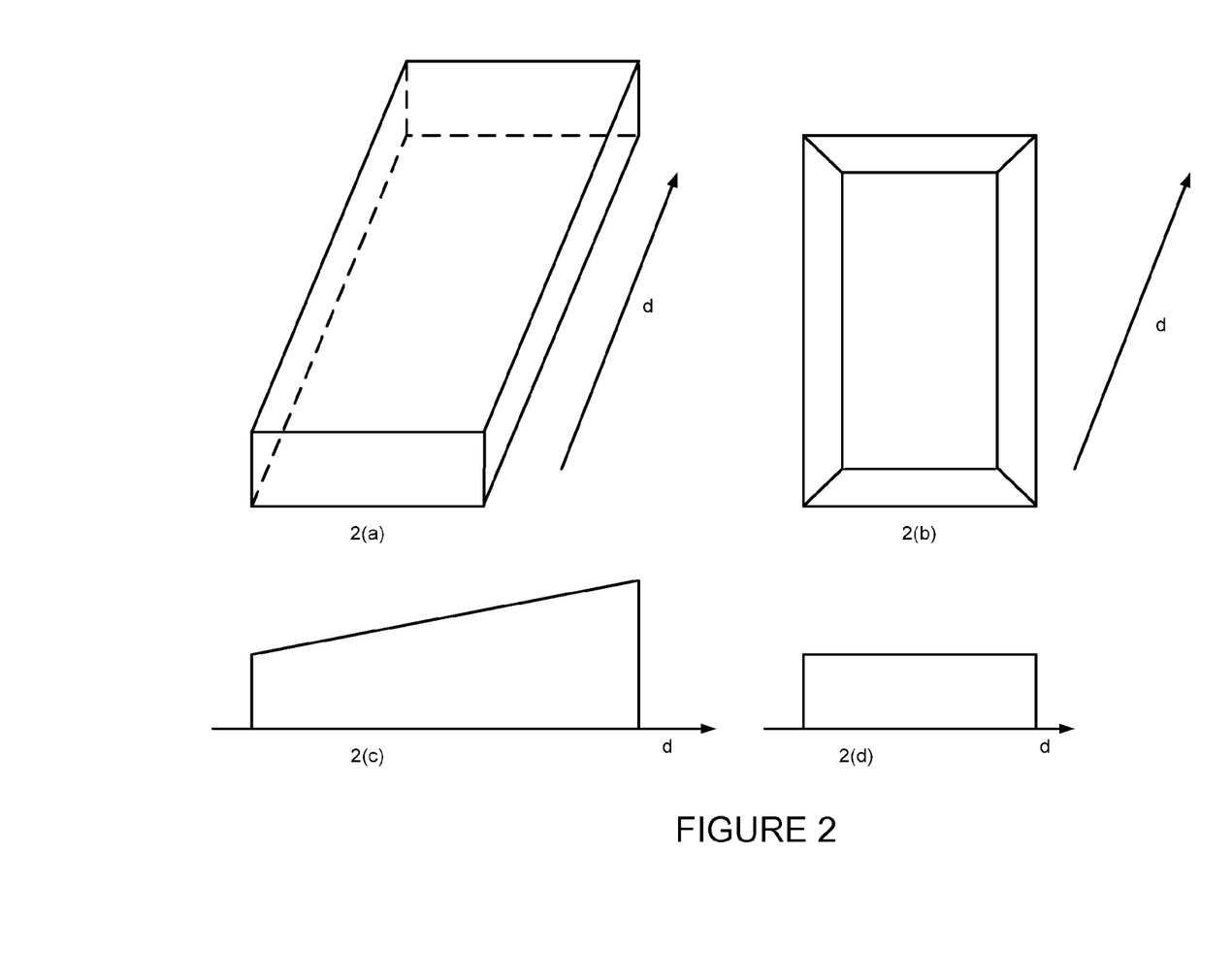
FIG. 2 (including FIGS. 2(*a*)-(*d*)) is an example of measurements in accordance with a preferred embodiment of the present invention.

FIG. 2 highlights the two cases. In FIG. 2(a), an object is slanted, hence having pixels at a range of disparities. In FIG. 2(b), an object is mostly upright relative to the FOV, hence having most of the pixels at one or two disparity values. Looking at the projections of both objects onto the disparity plane, the uncertainty or entropy shown in FIG. 2(c) is significantly higher than that of FIG. 2(d). Thus, FIG. 2(a) represents an object that is slanted and its associated projection in FIG. 2(c). The error between actual and computed disparity can be quite high. In FIG. 2(b), the object is mostly normal to the field of view and so the error between it and its projection in FIG. 2(d) is significantly lower. In accordance with various embodiments of the invention, this uncertainty in the depth map can be represented and exploited. It can also be mitigated through the utilization of a structured light source projected onto portions of the field-of-view, once such an initial depth map estimate is evaluated.

Disparity Smoothing with Structured Light Tessellations

The generated disparity map represents a surface-based approach to disparity computation. As mentioned in the above referenced '038 patent application, further refinement of the segments can be accomplished by breaking up larger segments both horizontally and vertically. To avoid having to perform this extra computation on a mobile or other system, one approach may be to utilize the screen for displaying a pattern onto the user's hand, and once a hand has been isolated in the FOV, then compute disparity of the pattern.

The smooth disparity estimate represents an integration of the disparity values over a number of rows. From the above referenced '038 patent application, the goal is to have s and s̃ overlap nearly entirely at one of the candidate disparity values. The appropriate disparity is estimated as one that maximizes the ratio of the subsequence, relative to its sequence. However, there is a simplifying assumption that may be made in the estimation of disparity, since clustering groups of pixels together fits such pixels planarly, depriving them of any continuous and gradual change. The disparity value that is associated with large objects represents an approximation of the value that is associated with every pixel in such objects. A better approximation of the true value still requires a further step, as mentioned earlier.

Once regions have been extracted from the coarse disparity map, such regions may be depth-computed by projecting a series of coarse tessellations and imposing a smoothing value, to be associated with the actual data. Every tessellation has a series of computed disparity values that are based on a combination of the original disparity estimate as well as the coarse structured light values, presented in Equation 3 above.

It is worth noting that:

$$Pr(d|S) \geq Pr(d|\tilde{d}_0), \forall (x',y') \in D \quad \text{Equation 4}$$

such that D represents a subset of values of the image, representing the structured set. So, although fewer in number, absent of an iterative step, the structured light depth approximations represent an upper limit on the probability of the computed disparity for the pixels with such values, referenced earlier, provided the computed depth is accurate. However the computed disparities based on the tessellations are too few in number and too coarse, in addition to the number of drawbacks presented earlier in the document. The solution that is being presented here in accordance with an embodiment of the invention preferably including combining both approaches actually leads to an enhanced probability limit. One can observe:

$$Pr(d|d',S) \geq Pr(d|\tilde{d}_0), \forall (x,y) \quad \text{Equation 5}$$

Minimizing Entropy

Hypothetically, for an object that is completely normal to the FOV, the entropy associated with its disparity computation is minimal, since the calculated disparity is based on a computational stereo algorithm that utilizes parallel surfaces to fit segments to their respective disparities. For an object that is slightly tilted in the field of view, the entropy that is associated with computing its disparity is greater, since the object's disparity values are distributed, as was presented in the preceding section, and illustrated in its associated figures.

Another way to view this approach is from an entropy-minimization standpoint. For a given segment s, with an estimated segment, s̃, and associated estimated disparity d̃, the more depth values that are associated with the segment, the higher the entropy value that is associated with the segment's estimated disparity d̃ and vice versa. So, if a segment is perfectly orthogonal to the field-of-view, then the entropy is very close to zero, since the depth estimate is very accurate. However, for slanted segments, the entropy increases significantly.

Since the secondary step that has been described above is performed on the data, depth smoothing is accomplished through an estimate of Ψ. The different data values, Ψ(x,y), of the tessellations, represent points of higher certainty in the disparity estimates. The overall depth map is then recomputed based on the approximated Ψ. To minimize the entropy of the estimated value, the data, d', are smoothed or "influenced" by Ψ and redistributed.

Define the conditional entropy, $Q(d|\tilde{d})$, associated with a depth estimate, d', as:

$$Q(d|\tilde{d}) = -\sum_i Pr(d|\tilde{d}) \cdot \log Pr(d|\tilde{d}) \quad \text{Equation 6}$$

Since the conditional probability, $Pr(d|\tilde{d})$, is defined as the probability of getting a disparity d, when the computed (in this case, observed) disparity is d̃, then, one can discern the relationship:

$$Pr(d|\tilde{d},S) \geq Pr(d|\tilde{d}) \quad \text{Equation 7}$$

where S represents the presence of a structure that is associated with the data or a portion of the data, based on the active light source. It is possible to infer the joint conditional entropy, in relation to the conditional entropy associated with the computed depth map:

$$Q(d|\tilde{d},S) \leq Q(d|\tilde{d}) \quad \text{Equation 8}$$

Entropy minimization becomes very useful in near-touch applications, and highlights how the presence of a directed active stereo tessellation can effectively smooth out the computed and identified depth surfaces, building a more reliable depth map. Having a greater certainty in the data due to the integration of an active light source is a computationally efficient means of identifying "touch points", regions in the FOV that are close enough to activate the system and replace multi-touch. Instead of the standard light source approach, a defined region with a projected light source becomes a more efficient approach to depth estimation in near-touch applications.

Operating Under Various Lighting Conditions

Heterogeneous Sensors to address all Lighting Conditions.—Scene analysis may be classified through three sets of lighting scenarios, without loss of generality:

Indoor lighting: normal lighting conditions in which there is abundant ambient lighting. In such a case, the system may be normally configured to handle very good lighting conditions, and after dewarping, the stereo algorithm should perform very well, with refinement in the form of the structured light tessellations, enabling a smooth depth map.

Outdoor lighting: in such a case, the reader is referred to the above referenced '038 patent application, in which all the different lighting conditions can be accounted for through a very aggressive segmentation/tracking algorithm.

Night-time/NIR conditions: the screen itself may be employed as an active light source. The value associated with the tessellations is increased, while the screen illuminates the FOV and still enables near-touch applications. In an alternative embodiment of the invention, one or more pairs of stereo cameras employed in accordance with various embodiments of the present invention may comprise cameras that cover both a visible and infrared portion of the electromagnetic spectrum. Alternatively, multiple cameras may be employed, together covering such a portion of the spectrum. In this manner, in dim light, infrared information may be relied upon, in part or whole, to aid in determining or refining disparity. If ambient light is determined to be sufficient for visible spectrum viewing, the infrared portion of the data may be disregarded.

Figure 3:
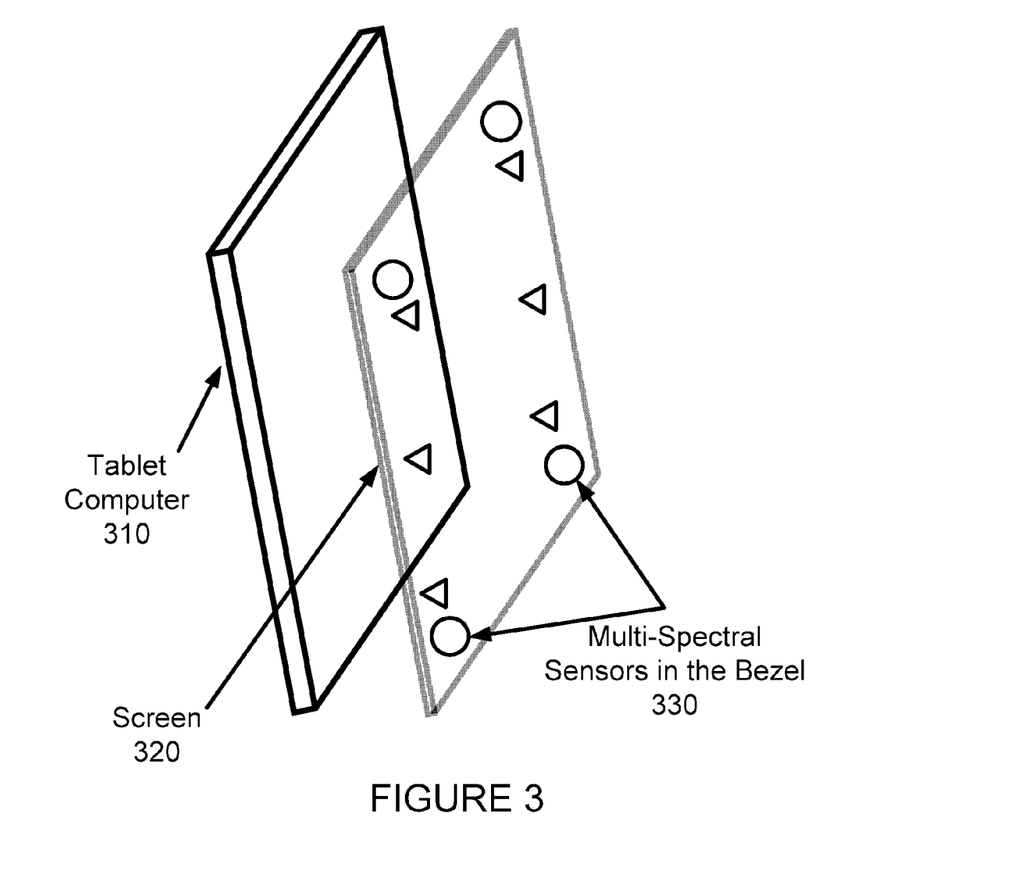
FIG. 3 is a perspective view of a tablet computing device employing sensors in accordance with a preferred embodiment of the present invention.

To accommodate for the different scenarios, a very good option is to preferably utilize a grid of sensors, as depicted in FIG. 3. As is shown in FIG. 3, a tablet computer or other mobile device 310 is shown with a screen 320 and a sensor grid 330 embedded therein. In such a case, the sensor grid may be sensitive to a broad range of lighting conditions, and the system may seamlessly switch between any different sensors depending on environmental conditions.

Advantages of this Approach

This approach, as set forth in the various embodiments of the present invention, has many advantages. The disparity computation step provides a very detailed depth map in the x-y dimension with significant resolution in the z-dimension. The addition of a structured light source emanating from the tablet's screen itself further refines aspects of this depth map, to better address ambiguous data and provide for further accuracy, and a reduction in the uncertainty that is associated with the data. Typical structured light approaches have proven to be cumbersome, requiring a strong light source, and generating a coarse depth map. Furthermore, there has never been an attempt to utilize a targeted structured light, activating only in specific regions of the field of view, especially ones that are masked away from the user's view, and in which the user's hand is at close proximity to the screen. This approach reduces computational complexity, and improves responsiveness and accuracy of the overall system. Many other advantages may be realized in accordance with various embodiments of the invention.

A new approach for embedded disparity computation for near-touch systems is presented. This approach is efficient and fast, utilizing a combination of a novel stereo algorithm as well as targeted light structures projected on parts of the scene by the screen itself, at distances close to near-touch, in the form of tessellations. The computed tessellations are then utilized to smooth the depth map, and minimize the uncertainty that is associated with the data. The system is very efficient and utilizes a previously developed depth map. The realization of the system is accomplished with a grid of smart sensors that are used, in conjunction with the screen, to address various lighting conditions. Other benefits may be apparent in accordance with application of the present invention. Indeed, while a near-touch system is described, embodiments of the invention may be applied to any gesture-relevant situation (applications) or even a three-dimensional scene reconstruction near the surface of a tablet device.

In accordance with various embodiments of the invention, a number of benefits may be provided, including the following: A new algorithm utilizing both a passive stereo algorithm that is based on our previous work and a structured, targeted tessellation projected on the field-of-view from the screen. An advanced sensor grid to address various lighting conditions that are associated with the system. Identification of "touch points" based on the produced smooth disparity map. Utilization of the disparity map with a multi-touch API or a 3D API.

In accordance with one or more embodiments of the present invention, it is further contemplated that various hardware configurations, including sufficient processing, storage and transmission systems are provided to support the various processors and steps described above. It is further contemplated that such storage and processing elements may be provided locally within a device, or remotely on a cloud or other remote computing or storage environment. In such a situation, communication systems operating over one or more available communication systems may be employed, and also providing for an integrated device capable of combining information from one or more locally and remotely processed, stored or otherwise manipulated information or programming.

Various embodiments of the invention further contemplate a computer program stored on a non-volatile computer medium within the device, or at a remote location. The computer program causing a computer or other processor in the device or remote location to implement an API to aid in performing one or more of the following steps.

Generating or refining a coarse depth map

Providing any above-noted control over fine-tuning the light tessellations

Determining one or more critical data points for acquisition

Providing control over various screen functionality

Providing integration and replacement of touch-based or multitouch controls

Allowing for integration with one or more artificial intelligence (AI) algorithms for recognition and scene analysis Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

What is claimed is:

1. A system for determining near touch interaction, comprising:
   a display for displaying one or more elements thereon;
   one or more stereo camera pairs positioned adjacent to the display; and
   a processor for causing the display to flash one or more structured light sequences using the light sources that illuminate the display on a user pointer placed adjacent to the display, determining a depth map in accordance with information acquired by the stereo camera pair, and if desired, employing the one or more structured light sequences to possibly refine the depth map, wherein the display produces patterns targeting only regions of the field-of view where the depth refinement is determined to be beneficial, and determining a location corresponding to one or more of the one or more elements displayed on the display to be selected in accordance with the determined depth map.

2. The system of claim 1, further comprising one or more appropriate lenses to produce a shallow depth of field highlighting the user pointer closer to the field of view.

3. The system of claim 1, wherein the use of the shallow depth of field results in a blurred background.

4. The system of claim 1, where in the structured light is displayed on only one or more predetermined portions of the display.

5. The system of claim 4, wherein the structured light is directed at a predetermined portion of a field of view of the display.

6. The system of claim 1, wherein the structured light is provided by an image displayed on the display.

7. The system of claim 1, wherein information acquired by the one or more stereo camera pairs is dewarped.

8. The system of claim 1, wherein the processor is located remotely.

9. The system of claim 8, wherein the processor is located in a cloud computing environment.

10. A method for determining near touch interaction by a user object, comprising the steps of:
    displaying on a display one or more objects;
    acquiring one or more images of the user object by one or more pairs of stereo cameras located adjacent to the display;
    dewarping the one or more acquired images;
    computing a disparity based upon the dewarped images;
    identifying one or more target regions of the display adjacent to one or more corresponding portions of the disparity that may benefit from refinement, and displaying one or more screen tessellations therein using the light sources that illuminate the display, wherein the display produces patterns targeting only regions of the field-of view where the depth refinement is determined to be beneficial;
    refining the computed disparity in accordance with additional data received in accordance with the displayed screen tessellations; and
    determining one or more of the displayed objects to be selected by the user object in accordance with the redefined computer disparity.

11. The method of claim 10, wherein the one or more acquired images comprise a left and right image acquired at a substantially simultaneous time.

12. The method of claim 11, wherein the displaying of screen tessellations further comprises the step of flashing one or more structured light sequences on a targeted portion of the user object positioned adjacent to the display.

13. The system of claim 12, wherein the structured light is a targeted structured light.

14. The system of claim 13, where in the structured light is displayed on only one or more predetermined portions of the display.

15. The system of claim 13, wherein the structured light emanates from the display's pixels.

16. The system of claim 10, wherein the user object is a finger of the user.

17. The system of claim 10, wherein the light is adaptive, such that it is brighter when ambient light is greater and darker when ambient light is less.

18. The method of claim 10, wherein the patterns that are produced vary in one or more of size, location, orientation, or frequency, depending on the size and depth of the targeted region.

19. The method of claim 10, wherein the tessellations are interleaved with the actual data, allowing the system to display the structured light without the light being perceived by the user.

20. The system of claim 10, wherein the one or more pairs of stereo cameras cover both the visible range and infrared ranges.

21. The system of claim 20, wherein if it is determined that the light source is strong enough, the infrared sensors are disregarded.

22. The method of claim 10, wherein the one or more pairs of stereo cameras are dual band, covering substantially both of the visible range and infrared range.

23. The method of claim 10, wherein the one or more stereo pairs comprise lenses that are able to properly display objects that are closer to the cameras in the field of view.

24. The method of claim 10, wherein the one or more stereo pairs comprise lenses that play the role of multiple bandpass filters to allow and block different frequencies of the lighting spectrum.

25. A computer program stored on a non-transitory computer medium, the computer program causing a processor to implement an API to perform the steps of:
    generating or refining a coarse depth map;
    determining one or more critical data points to assist in refining the coarse depth map;
    providing control over fine-tuning one or more light tessellations to be displayed on at least a portion of a display using the light sources that illuminate the display to aid in acquisition of the one or more critical data points, wherein the display produces patterns of the tessellations targeting only regions of the field-of view where the depth refinement is determined to be beneficial; and
    performing scene recognition and analysis in accordance with one or more artificial intelligence algorithms based upon the coarse depth map as refined in accordance with the acquired one or more critical data points.

* * * * *